(12) United States Patent
Alabi et al.

(10) Patent No.: US 10,438,123 B2
(45) Date of Patent: Oct. 8, 2019

(54) COGNITIVE PUBLICATION SUBSCRIBER SYSTEM, METHOD, AND RECORDING MEDIUM WITH A FIREWALL

(71) Applicant: International Business Machines Corporation, Armonk, NY (US)

(72) Inventors: Oluwatosin Alabi, Yorktown Heights, NY (US); Minkyong Kim, Scarsdale, NY (US); Min Li, San Jose, CA (US); Clifford A. Pickover, Yorktown Heights, NY (US); Valentina Salapura, Chappaqua, NY (US); Luna Xu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 656 days.

(21) Appl. No.: 14/945,782

(22) Filed: Nov. 19, 2015

(65) Prior Publication Data

US 2017/0147926 A1 May 25, 2017

(51) Int. Cl.
*G06N 5/04* (2006.01)
*H04L 12/58* (2006.01)

(52) U.S. Cl.
CPC ............... *G06N 5/04* (2013.01); *H04L 51/12* (2013.01)

(58) Field of Classification Search
None
See application file for complete search history.

(56) References Cited

U.S. PATENT DOCUMENTS

| | | | |
|---|---|---|---|
| 9,148,768 B2 | 9/2015 | Scorcioni | |
| 2004/0254998 A1* | 12/2004 | Horvitz | G06Q 10/107 709/206 |
| 2007/0004389 A1* | 1/2007 | Wallace | G06Q 10/06 455/415 |
| 2011/0224557 A1* | 9/2011 | Banet | A61B 5/00 600/485 |
| 2011/0306845 A1* | 12/2011 | Osorio | G16H 15/00 600/300 |
| 2013/0346511 A1* | 12/2013 | Park | G06Q 10/10 709/206 |
| 2015/0254406 A1 | 9/2015 | Rajasenan | |
| 2015/0363694 A1* | 12/2015 | Banerjee | H04L 67/306 706/46 |

OTHER PUBLICATIONS

Konur, Savas, Michael Fisher, Simon Dobson, and Stephen Knox. "Formal verification of a pervasive messaging system." Formal Aspects of Computing 26, No. 4 (2014): 677-694. (Year: 2013).*

* cited by examiner

*Primary Examiner* — Scott A. Waldron
*Assistant Examiner* — Casey R. Garner
(74) *Attorney, Agent, or Firm* — Rahan Uddin, Esq.; McGinn IP Law Group, PLLC (57) ABSTRACT

A cognitive publication subscriber method, system, and non-transitory compute readable medium receiving a signal from a signal generating device and a subscriber cognitive state including filtering the signal being received by a plurality of subscribers based on the subscriber cognitive state and routing the signal to a subscriber of the plurality of subscribers, the subscriber cognitive state of the subscriber receiving the signal being based on a threshold.

18 Claims, 5 Drawing Sheets

COGNITIVE PUBLICATION SUBSCRIBER SYSTEM, METHOD, AND RECORDING MEDIUM WITH A FIREWALL

BACKGROUND

The present invention relates generally to a cognitive publication subscriber system with a firewall, and more particularly, but not by way of limitation, to a cognitive publication subscriber system with a firewall for intensive care units and other distracted groups.

Conventionally, medical professionals in Intensive Care Units (ICUs) are bombarded and distracted by a range of sounds and other distractions, e.g. from patient monitors. The number and variety of sounds and other signals can be overwhelming. When the various audio signals become too numerous, it is difficult for support staff to judge how best to filter, control, and attend to the various sounds, by personnel with different levels of experience. If too many signals are present, people may become "blind" to them.

That is, alarm fatigue can occur in many industries, including but not limited to, construction and mining (where backup alarms sound so frequently that they often become senseless background noise) and healthcare (where electronic monitors tracking clinical information, such as vital signs and blood glucose, sound alarms so frequently, and often for such minor reasons, that they lose the urgency and attention-grabbing power that they ought to have). Like crying wolf, such false alarms rob the valid alarms of the value they were intended to add (duly alerting people to danger)."

Conventional techniques to limit alarm fatigue are either topic-based, content-based, or a combination of the two. In the topic-based pub/sub system, a user can subscribe to topics; all the messages that are published to those topics will be delivered to the corresponding subscribers. In the content-based pub/sub system, a user can specify attributes or contents of messages that he/she wants to receive. The messages that contain those contents will be delivered to the subscribers. These conventional techniques fail to consider the cognitive status of the subscriber/receiver.

Other conventional techniques for reducing alarm fatigue include sensor outputs that are delivered to a computer that sounds an alarm, and only if all the sensors that indicate one function (e.g. heart beating) indicate dangerously low operation of that function. This avoids many false alarms caused by one sensor having a low output such as due to accidental disconnection of a wire.

Thus, there is a technical problem in the conventional information disclosing techniques that the techniques do not consider a cognitive state of the subscriber. More specifically, each conventional technique attempts to reduce the amount of alarms without considering the cognitive state of the subscriber who will attend to the alarm when the alarm is activated.

SUMMARY

In an exemplary embodiment, the present invention can provide a publication subscriber system receiving a signal from a signal generating device and a subscriber cognitive state, the system including a message control device including a message filtering device configured to filter the signal being received by a plurality of subscribers based on the subscriber cognitive state and a message routing device configured to route the signal to a subscriber of the plurality of subscribers, the subscriber cognitive state of the subscriber receiving the signal based on a threshold.

Further, in another exemplary embodiment, the present invention can provide a non-transitory computer-readable recording medium recording a publication subscriber program receiving a signal from a signal generating device and a subscriber cognitive state, the program causing a computer to perform: filtering the signal being received by a plurality of subscribers based on the subscriber cognitive state and routing the signal to a subscriber of the plurality of subscribers, the subscriber cognitive state of the subscriber receiving the signal based on a threshold.

Even further, in another exemplary embodiment, the present invention can provide a cognitive publication subscriber method receiving a signal from a signal generating device and a subscriber cognitive state, the method including filtering the signal being received by a plurality of subscribers based on the subscriber cognitive state and routing the signal to a subscriber of the plurality of subscribers, the subscriber cognitive state of the subscriber receiving the signal based on a threshold.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
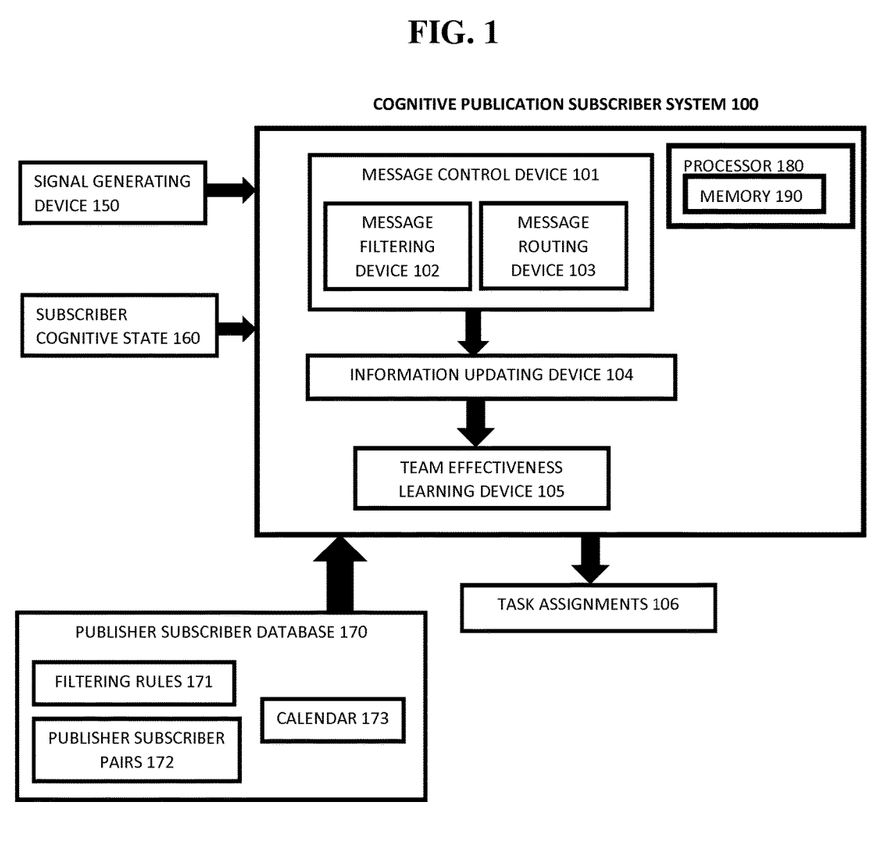
FIG. 1 exemplarily shows a block diagram illustrating a configuration of a cognitive publication subscriber system 100.

With reference now to FIG. 1, the cognitive publication subscriber system 100 includes a message control device 101, an information updating device 104, and a team effectiveness learning device 105. The cognitive publication subscriber system 100 receives alarm signals from a signal generating device 150 and a subscriber cognitive state 160. Further, the cognitive publication subscriber system 100 receives data from the publisher subscriber database 170. The cognitive publication subscriber system 100 includes a processor 180 and a memory 190, with the memory 190 storing instructions to cause the processor 180 to execute each device of cognitive publication subscriber system 100.

Although the cognitive publication subscriber system 100 includes various devices, it should be noted that a cognitive publication subscriber system can include modules in which the memory 190 stores instructions to cause the processor 180 to execute each module of cognitive publication subscriber system 100.

With the use of these various devices, the cognitive publication subscriber system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e. humans) that all agree are cognitive.

Figure 3:
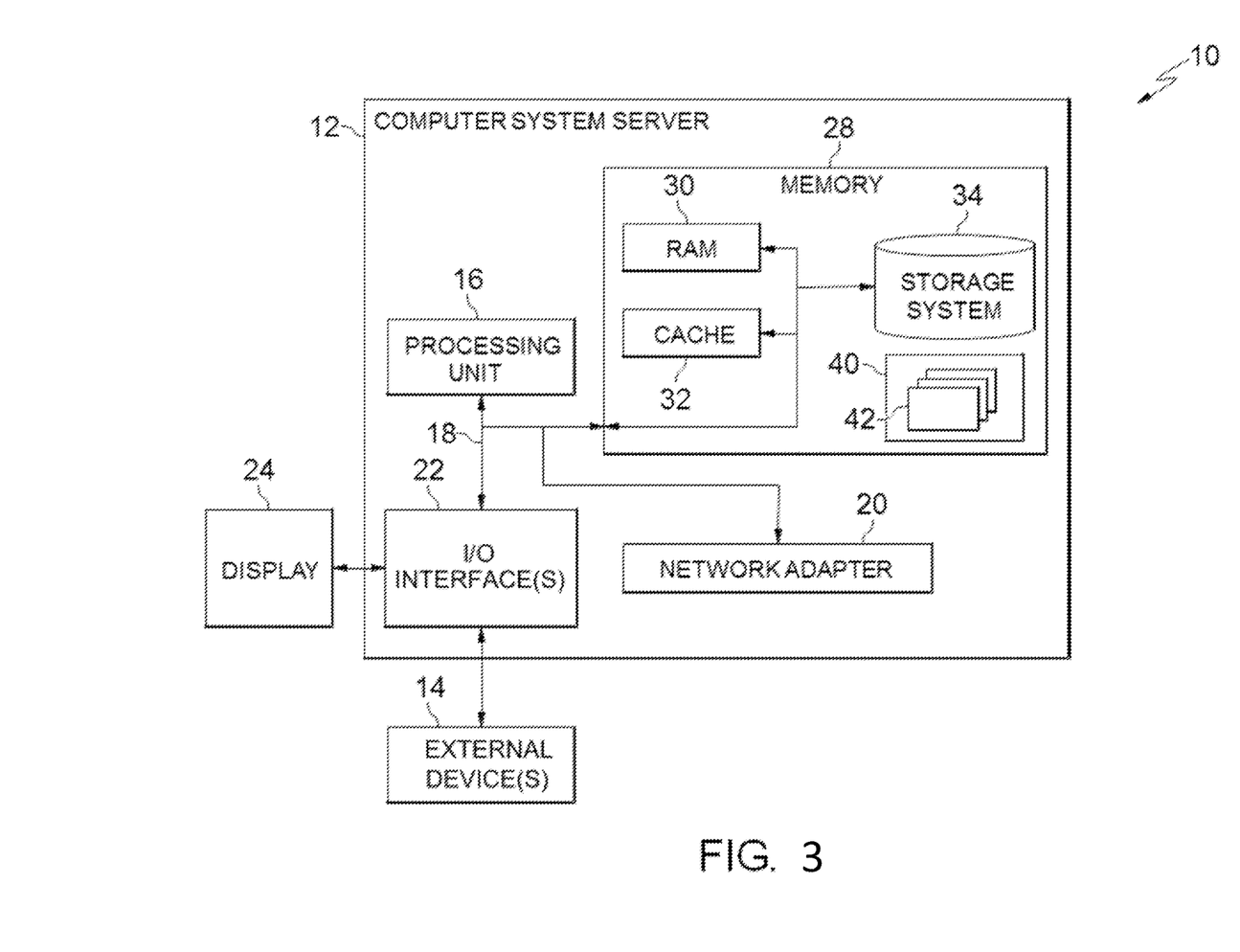
FIG. 3 depicts a cloud computing node according to an embodiment of the present invention.
Figure 4:
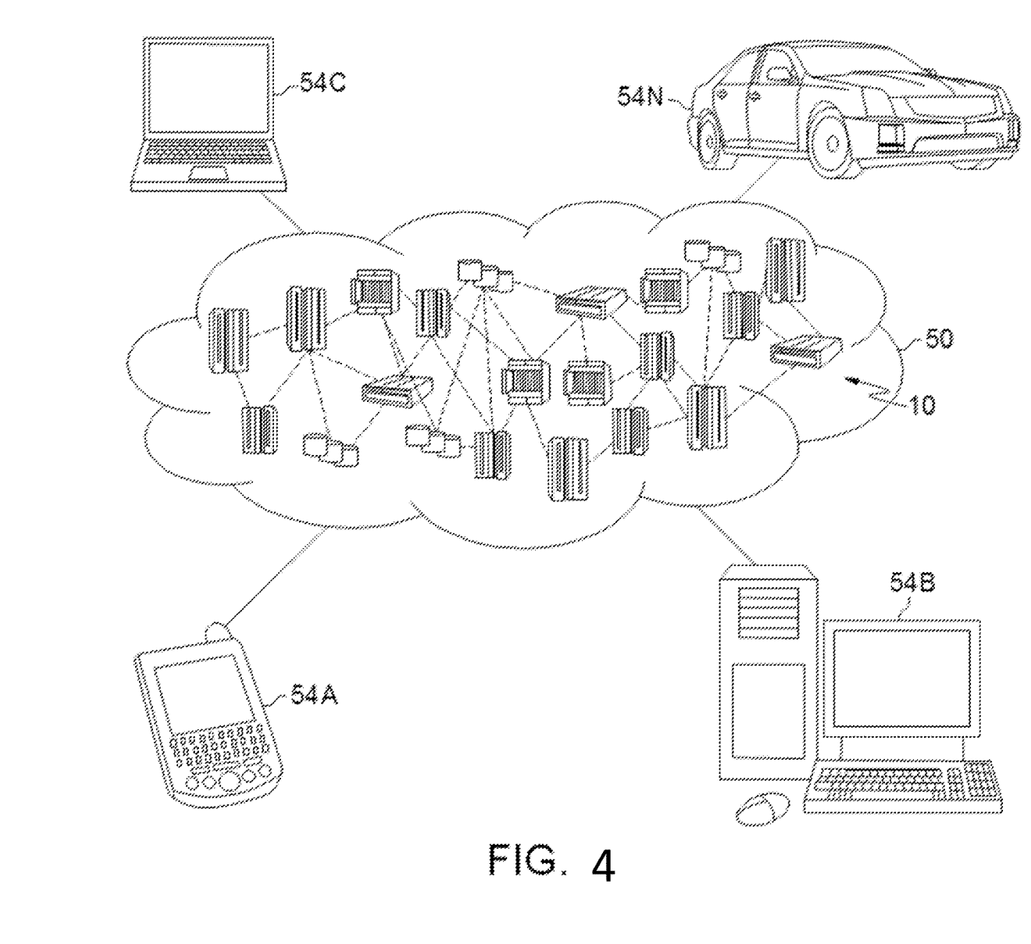
FIG. 4 depicts a cloud computing environment according to another embodiment of the present invention.
Figure 5:
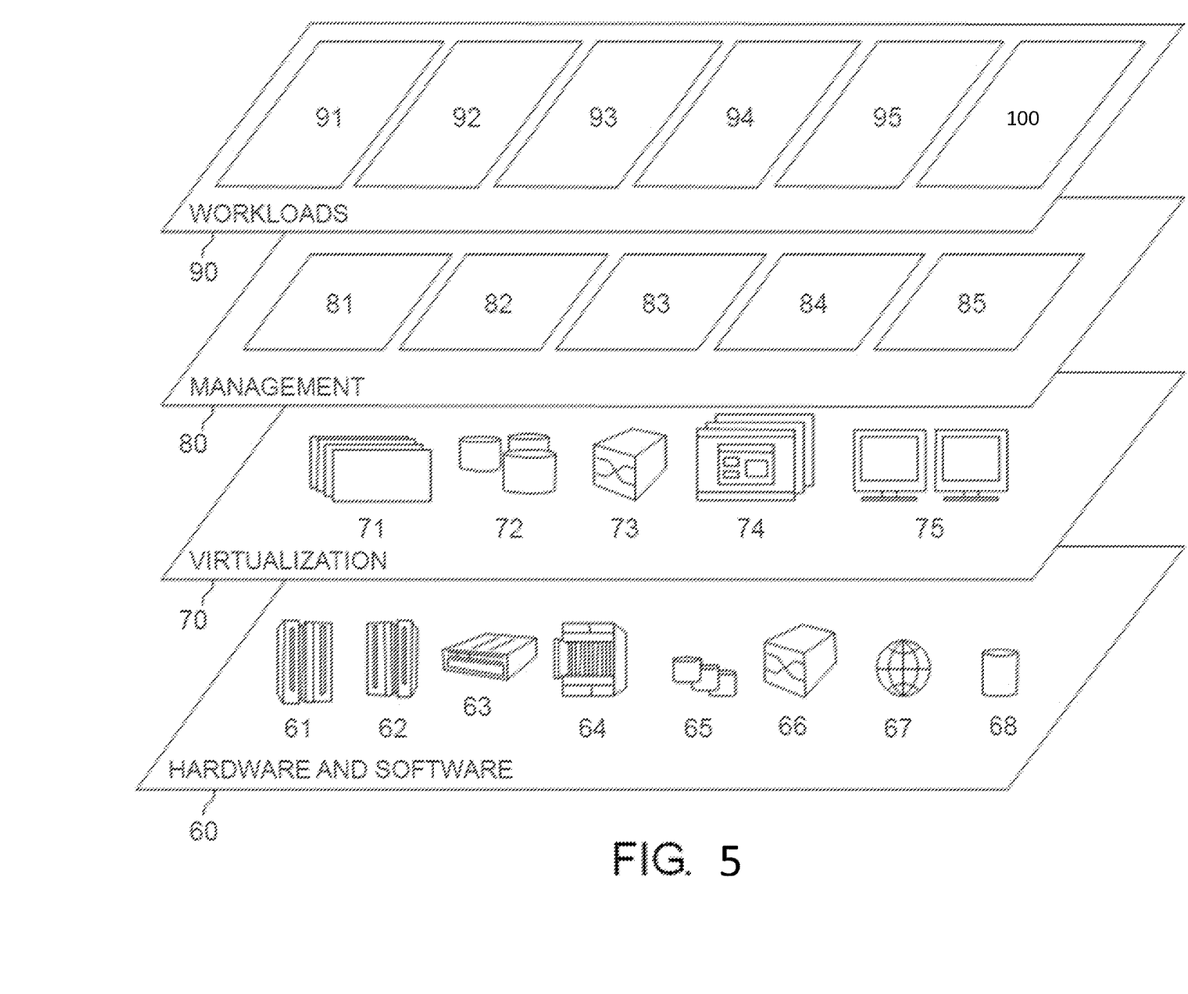
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the cognitive publication subscriber systems 100 (FIG. 5), it is noted that the present invention can be implemented outside of the cloud environment.

The subscribers may include nurses, doctors, assistants, Artificial Intelligence (AI) agents, drones, robots, emergency personnel, etc. Although the embodiments herein focus in ICUs, the invention may have application for any kind of subscriber that attends to various signals. AI agents include but are not limited to intelligent software agents (e.g., exhibiting some aspect of artificial intelligence, such as learning and reasoning) and autonomous software agents (capable of modifying the way in which they achieve their objectives), and they may be embodied as distributed software agents (being executed on physically distinct computers).

The signal generating device 150 may include, but not limited to, cardiac or heart monitors, pulse oximeters, Swan-Ganz catheters, arterial lines (a-lines), electrocardiogram (ECG/EKG), intracranial pressure (ICP) Monitor, hemodynamic monitors, neurological monitors, blood glucose monitors, body temperature monitors, etc.

Different subscribers handle stress differently and have different levels of experience and knowledge (i.e., a cognitive state of a subscriber). Thus, the subscriber cognitive state 160 of subscribers may be obtained through monitoring devices (e.g. Fitbit™ on subscriber's arm for blood pressure, various trackers of distraction level, smartwatches, electronic calendars with schedule information, level of multitasking, etc.). Further, the publisher subscriber database 170 can include a calendar for each subscriber such that the subscriber cognitive state 160 can be determined based on the subscriber's calendar. For example, if the calendar 173 indicates a person has been on duty for 10 hours, this may also be considered in determining the subscriber cognitive state 160. Various approaches are possible for estimating a user's cognitive state. For example, Face-tracking technology allows computers to read facial expressions and emotions associated therewith.

The subscribers cognitive state can be calculated using a simple algorithm $CS=\Sigma w_i F_i$; where Wi is weight and Fi is factor of the users state. Another way may be considering the maximum difference (or deviance) from the "manageable" load. For a given Fi, the administrator can predefine the threshold, Ti. Assume that higher value for Fi means more stress or more loads, etc. The difference (or deviance) (which is normalized or weighted) of Fi from Ti is called Di. The user's state can be defined as max(Di). Intuitively, this is to avoid sending the request or message to a user who is too overwhelmed in at least one aspect/factor of his/her cognitive state.

The message control device 101 includes a message filtering device 102 and a message routing device 103.

The message filtering device 102 of the message control device 101 receives the signals from the signal generating device 150 and the subscriber cognitive state 160. The message filtering device (i.e., the cognitive firewall) differentially filters signals to subscribers, with consideration to the severity level of a signal, the subscriber cognitive state 160, filtering rules 171 of the publisher subscriber database 170, publisher subscriber pairs 172, etc. The filtering settings of message filtering device 102 can be changed by subscribers, supervisors, insurance companies, patients, etc. The modality of the subscription may be controlled (e.g. signal sent to an earpiece, converted from a sound to a light, converted from a light to a sound to a vibration, etc.) The subscriber may also affect the settings, at least to some degree (e.g. a nurse may specify "I need a break," "I can't take this any longer.") The patient (i.e., end-user) may also affect the settings, at least to some degree (e.g. I am worried and I want a nurse to check this blinking red light).

Further, the control of the message filtering device 102 can be a filtering, a delaying, a changing of the number and nature of subscribers who receive signals, etc. Further, messages may be acknowledged and stored, if desired.

In some embodiments, the signal generating device 150 can be a subscriber and modulate their output (e.g. volume of a sound). The message filtering device 102 can also consider the redundancy in terms of the number of subscribers who would receive a particular message. If too few subscribers would receive a particular message due to the cognitive status (such as that everybody is too busy), the message filtering device 102 may "override" the filtering of the message due to the subscriber cognitive state 160 and deliver it to the minimum number of subscribers (possibly specified by the user/admin). It also can generate a suggestion of task assignments 106 to temporarily assign a new set of doctors or nurses to make sure each patient receives sufficient attention.

Moreover, the message filtering device 102 may assign a priority/weight to each signal from the signal generating device 150 based on the prior knowledge about the meaning of that signal.

For example, a pulse signal in a normal range receives a very low priority, pulse values in extremely high or low ranges require attention, and increase their priority. The subscriber cognitive state 150 is accessed, and if the level of stress is in acceptable levels for that subscriber, new signals are sent. Each subscriber has a range of acceptable business and stress level, and this level is learned over time for each subscriber, and is modified over time by the information updating device 104.

The routing of signals to subscribers by the message routing device 103 may continue until the subscriber feels that the stress level is becoming close to overwhelming, and making the subscriber less effective. Similarly, the subscriber can indicate that the level of engagement is too low, and that they can handle more signals. If a subscriber is in the saturation state, no new signals will be sent to them until either their stress level is measured lower, or a high emergency signal, which requires immediate attention is detected, and no other subscribers are available in the patient's proximity to handle it.

Also, the message filtering device 102 filters the signals based on the skill set of nurses and doctors but would more likely be sent to a nurse or orderly. For example, a call from a patient who needs assistance to get up will not be sent to the nearest doctor. If however, no other person is available in the patient's proximity, this signal will not be filtered out.

The message filtering device 102 also considers the cognitive status of patients. For example, the patient feels afraid, or angry, by pushing the button many times and nobody is coming. In this case, the filtering system will decide whether to increase the priority of the message or to resend again the message, instead of just publishing several messages in a row.

In other words, the subscriber cognitive state of the subscriber that receives the signal is based on a threshold. The threshold including each of the aforementioned conditions of the subscriber cognitive state.

Based on the message filtering of the message filtering device 102, the message routing device 103 routes the messages (i.e., signals) to the correct subscriber to handle the signal. In other words, the message routing device 103 gives the task assignments 106 to the subscribers based on the message filtering according to the subscriber cognitive state 160.

The subscribers to receive the messages can be based on a set of users (subscribers) who have the right skill set. From this set, based on the value (i.e., CS) that was obtained from calculation the cognitive state, the message routing device 103 can chose the users with $\min(\Sigma CS_j)$ assuming that lower value for CS means less workload or less stress, etc. Also, the message routing device 103 can recursively choose a few people until the minimum number of users has been selected (based on the pre-configured minimum requirement for the task).

The information updating device 104 also updates the information in publisher subscriber database 170 either by automatically communicating with the task assignments 106 or by receiving inputs from a user interface. It also updates information triggered by various information sources including the subscriber cognitive state 160, etc.

The team effectiveness learning device 105 learns how publisher subscriber pairs 172 work together and attempts to assist the message routing device 103 to route the signals to a pair of subscribers that work well together.

More plainly stated, the team effectiveness learning device 105 learns the effectiveness of a team and an individual and make suggestions to the message routing device 103 for tasks assignments 106. For example, a doctor might work more efficiently with a particular set of nurses.

It should be noted that the message routing device 103 includes several redundancies in routing the signals to the subscriber. For example, every signal may be routed by the message routing device 103 to a plurality of subscribers such that the patient receives quicker attention. Also, if the patient has not received a subscriber for a predetermined period of time, the message filtering device 102 can determine that the patient now has a higher priority such that the message routing device 103 can route the signal to more subscribers. The routing to additional subscribers continues until the signal is attended to by a subscriber.

Also, the filtering rules 171 can include user inputs based on reviews from colleagues, supervisors, personal assessments, etc. so as to better determine the subscriber cognitive state 160 of that particular subscriber and filter the messages by the message filtering device 102 accordingly.

Figure 2:
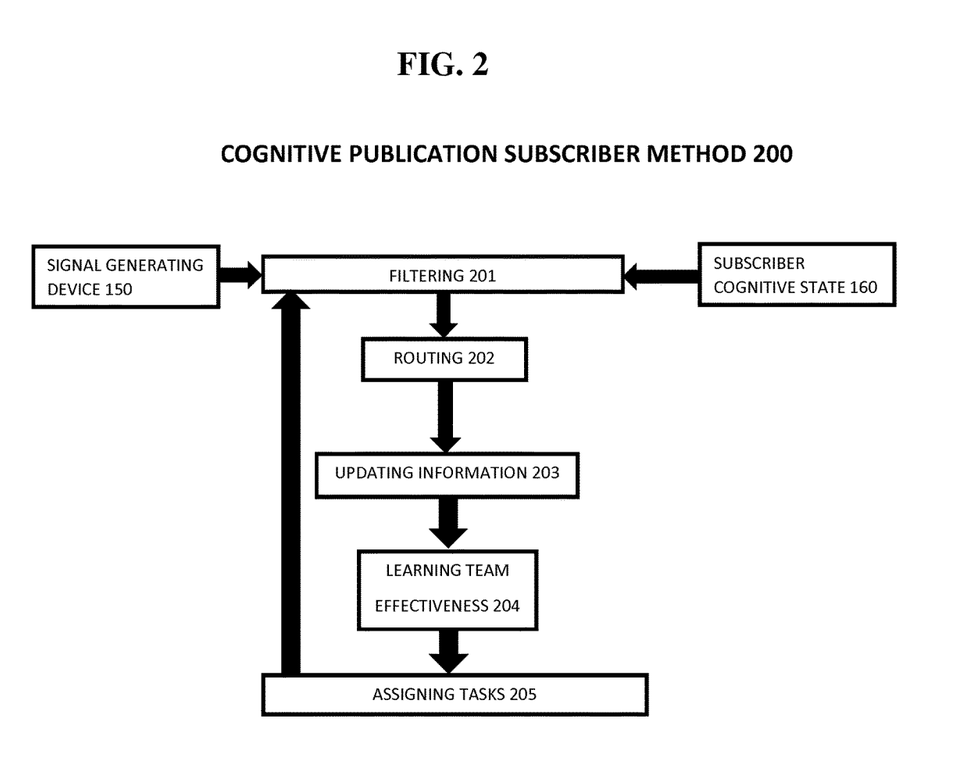
FIG. 2 exemplarily shows a high level flow chart for a cognitive publication subscriber method.

FIG. 2 shows a high level flow chart for a method 200 for a cognitive publication subscriber method.

Step 201 receives a signal from the signal generating device 150 and the subscriber cognitive state 160 and differentially filters signals to subscribers, with consideration to the severity level of a signal, the subscriber cognitive state 160, filtering rules 171 of the publisher subscriber database 170, publisher subscriber pairs 172, etc.

Based on the filtering of Step 201, Step 202 routes the messages (i.e., signals) to the correct subscriber to handle the signal.

Step 203 updates the information in the publisher subscriber database based on the subscriber cognitive state 160, the filtering in Step 201 and the routing in Step 202.

Step 204 learns team effectiveness by learning how publisher subscriber pairs 172 work together and attempts to assist the message routing in Step 202 to route the signals to a pair of subscribers that work well together.

More plainly stated, Step 204 learns the effectiveness of a team and an individual and make suggestions to the routing in Step 202 better assigning of tasks in Step 205.

Step 205 assigns tasks to the subscribers based on the message filtering of Step 201 according to the subscriber cognitive state 160 and the routing of Step 202.

After the tasks have been assigned in Step 205 to the subscribers, the method loops back to Step 201 and continuously performs the steps to assign tasks to subscribers based on signals generated by the signal generating device 150 and the subscriber cognitive state 160.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the cognitive publication subscriber system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A publication subscriber system receiving a signal from a signal generating device and a subscriber cognitive state, the system comprising:
   a processor; and
   a memory, the memory storing instructions to cause the processor to execute:
      a message control device including:
         a message filtering device configured to first filter the signal being received by a plurality of subscribers based on the subscriber cognitive state; and
         a message routing device configured to route the signal to a subscriber of the plurality of subscribers, the subscriber cognitive state of the subscriber receiving the signal being based on a threshold and a proximity of the subscriber to the system,
      wherein the signal comprises an alarm indicating a task for the subscriber to perform,
      wherein the message filtering device filters the signal to the plurality of subscribers based on a severity level of the signal and a stress level of the subscriber,
      wherein the message filtering device overrides the message routing device and sends the signal to a nearest subscriber regardless of the subscriber cognitive state when the severity level of the signal is greater than a predetermined threshold, and
      wherein the message routing device selects as a second filter a subset of the plurality of subscribers, the subset being a group in which the message filtering device filtered as a possible recipient to deliver the signal according to the subscriber cognitive state, to deliver the signal based on a skill set of the subset of the plurality of subscribers.

2. The system of claim 1, wherein the signal generating device includes cardiac or heart monitors, pulse oximeters, Swan-Ganz catheters, arterial lines (a-lines), electrocardiogram (ECG/EKG), an intracranial pressure (TCP) monitor, a hemodynamic monitor, a neurological monitor, a blood glucose monitor, and a body temperature monitor.

3. The system of claim 1, wherein the plurality of subscribers include nurses, doctors, assistants, Artificial Intelligence (AI) agents, drones, robots, and emergency personnel.

4. The system of claim 1, wherein the subscriber cognitive state is measured using at least one of a blood pressure measuring device, tracking of a distraction level of the subscriber, a smartwatch, a calendar with schedule information, a level of multitasking, a peer review, a personal assessment, facial emotion recognition, and a prior performance of tasks routed to the subscriber.

5. The system of claim 1, wherein the message filtering device filters the signal by changing a number of subscribers of the plurality of subscribers when the message routing device routes the signal.

6. The system of claim 1, wherein the message filtering device filters the signal by delaying the signal to the plurality of subscribers, and
   wherein the message filtering device filters the signal by changing a number of subscribers of the plurality of subscribers when the message routing device routes the signal.

7. The system of claim 1, wherein the message routing device continuously routes the signal to additional subscribers of the plurality of subscribers until the task assignment is completed.

8. The system of claim 1, wherein the memory further stores instructions to cause the processor to:
   update a publisher subscriber database including filtering rules, publisher subscriber pairs, and calendar data used to determine the subscriber cognitive state.

9. The system of claim 1, wherein filtering rules for the message filtering device are dynamically changed according to prior task assignments of the subscriber.

10. The system of claim 1, wherein, if the subscriber receiving the routed signal has not performed the task assignment for a predetermined period of time, the message filtering device determines that the routed signal has a higher priority, such that the message routing device routes the routed signal to a second subscriber of the plurality of subscribers.

11. The system of claim 1, wherein the message routing device routes the signal to at least two subscribers of the plurality of subscribers.

12. The system of claim 1, wherein the message filtering device filters the signal based on a cognitive state of an end-user.

13. The system of claim 1, wherein filtering rules for the message filtering device are changed according to a user input.

14. The system of claim 1, wherein the subset of the plurality of subscribers comprises a number of subscribers less than an available number of subscribers.

15. The system claim 1, wherein, if each of the subscribers in the subset of subscribers is busy, delaying the signal until a first subscriber in the subset is not busy.

16. The system of claim 1, wherein the signal overrides an activity of the subscriber in the subset when an importance of the signal is greater than a threshold value.

17. A non-computer-readable recording medium recording a publication subscriber program for receiving a signal from a signal generating device and a subscriber cognitive state, the program causing a computer to perform:
   first filtering the signal being received by a plurality of subscribers based on the subscriber cognitive state; and
   routing the signal to a subscriber of the plurality of subscribers, the subscriber cognitive state of the subscriber receiving the signal being based on a threshold and a proximity of the subscriber to the signal generating device,
   wherein the signal comprises an alarm indicating a task for the subscriber to perform,
   wherein the filtering filters the signal to the plurality of subscribers based on a severity level of the signal and a stress level of the subscriber,
   wherein the filtering overrides the routing and sends the signal to a nearest subscriber regardless of the subscriber cognitive state when the severity level of the signal is greater than a predetermined threshold, and
   wherein the routing selects as a second filter a subset of the plurality of subscribers, the subset being a group in which the filtering filtered as a possible recipient to deliver the signal according to the subscriber cognitive state, to deliver the signal based on a skill set of the subset of the plurality of subscribers.

18. A cognitive publication subscriber method receiving a signal from a signal generating device and a subscriber cognitive state, the method comprising:

first filtering the signal being received by a plurality of subscribers based on the subscriber cognitive state; and routing the signal to a subscriber of the plurality of subscribers, the subscriber cognitive state of the subscriber receiving the signal being based on a threshold and a proximity of the subscriber to the signal generating device, wherein the signal comprises an alarm indicating a task for the subscriber to perform, wherein the filtering filters the signal to the plurality of subscribers based on a severity level of the signal and a stress level of the subscriber, wherein the filtering overrides the routing and sends the signal to a nearest subscriber regardless of the subscriber cognitive state when the severity level of the signal is greater than a predetermined threshold, and wherein the routing selects as a second filter a subset of the plurality of subscribers, the subset being a group in which the filtering filtered as a possible recipient to deliver the signal according to the subscriber cognitive state, to deliver the signal based on a skill set of the subset of the plurality of subscribers.

* * * * *